(12) United States Patent
Favreau et al.

(10) Patent No.: US 11,164,244 B2
(45) Date of Patent: Nov. 2, 2021

(54) SYSTEMS AND METHODS FOR ASSESSING FRAUD RISK

(71) Applicant: The Western Union Company, Denver, CO (US)

(72) Inventors: Kevin Favreau, Denver, CO (US); Hollis Baugh, Littleton, CO (US); Robert Enzaldo, Littleton, CO (US)

(73) Assignee: The Western Union Company, Denver, CO (US)

( * ) Notice: Subject to any disclaimer, the term of this patent is extended or adjusted under 35 U.S.C. 154(b) by 0 days.

(21) Appl. No.: 16/576,145

(22) Filed: Sep. 19, 2019

(65) Prior Publication Data

US 2020/0013116 A1 Jan. 9, 2020

Related U.S. Application Data

(63) Continuation of application No. 12/858,611, filed on Aug. 18, 2010, now Pat. No. 10,453,122.

(51) Int. Cl.
*G06Q 40/00* (2012.01)
*G07G 3/00* (2006.01)
*G06Q 20/40* (2012.01)

(52) U.S. Cl.
CPC .......... *G06Q 40/00* (2013.01); *G06Q 20/4016* (2013.01); *G07G 3/003* (2013.01)

(58) Field of Classification Search
CPC ..... G06Q 40/00; G06Q 20/4016; G07G 3/003
See application file for complete search history.

(56) References Cited

U.S. PATENT DOCUMENTS

| | | | |
|---|---|---|---|
| 6,015,087 A | 1/2000 | Seifert et al. |
| 7,529,689 B2 | 5/2009 | Rowan |
| 8,078,515 B2 | 12/2011 | John |
| 8,195,485 B2 | 6/2012 | DeFrancesco et al. |
| 10,453,122 B2 | 10/2019 | Favreau et al. |
| 2003/0167237 A1 | 9/2003 | Degen et al. |
| 2004/0139032 A1 | 7/2004 | Rowan |
| 2004/0215558 A1 | 10/2004 | Morales et al. |
| 2004/0215574 A1 | 10/2004 | Michelsen et al. |
| 2008/0109356 A1 | 5/2008 | Sutton et al. |
| 2012/0047053 A1 | 2/2012 | Favreau et al. |

*Primary Examiner* — Scott S Trotter
(74) *Attorney, Agent, or Firm* — Kilpatrick Townsend & Stockton, LLP

(57) ABSTRACT

In some embodiments, a non-transitory computer-implemented method of assessing a fraud risk is provided. The method can include: receiving data associated with a plurality of customer complaints, wherein data associated with each of the customer complaints at least suggests that a money-transfer transaction did not complete as expected, and wherein data associated with each of the customer complaints is associated with one or more of a plurality of money-transfer agents; electronically storing the data related in a complaint database; and for each of the plurality of money-transfer agents, using a risk processor to: retrieve data associated with the money-transfer agent from the complaint database, and determine a fraud-risk index for the money-transfer agent based on the retrieved data.

20 Claims, 5 Drawing Sheets

|  | Report #1 | Report #2 | ... | Report #N |
|---|---|---|---|---|
| Report Information | | | | |
| Date/Time | | | | |
| Customer | | | | |
| Transaction Send Information | | | | |
| Date/Time | | | | |
| Location | | | | |
| Agent | | | | |
| Customer | | | | |
| Transaction Pay Information | | | | |
| Date/Time | | | | |
| Location | | | | |
| Agent | | | | |
| Intended Recipient | | | | |
| Attempted Retrieval Information | | | | |
| Date/Time | | | | |
| Location | | | | |
| Agent | | | | |
| Subsequent Matching Activity? | | | | |
| Resolution Information | | | | |
| Intended Payee Compensated? | | | | |
| Chargeback to Agent? | | | | |
| Transaction Amount | | | | |

Figure 5

|  | Entity #1 | Entity #2 | ... | Entity #M |
|---|---|---|---|---|
| History with Company | | | | |
|   Position | | | | |
|   Date Started with Company | | | | |
|   Date Started at Current Location | | | | |
|   Number of Previous Incidences | | | | |
|   Severity of Previous Incidences | | | | |
| Report Summaries | | | | |
|   Number of Reports | | | | |
|   Statistics re: Report Transaction Amounts | | | | |
|   Statistics re: Report Transaction Dates/Times | | | | |
|   Number of Compensated Reports | | | | |
|   Number of Reports with Subsequent Matching History | | | | |
|   Number of Chargebacks | | | | |
|   Number of Paid-in-Error Transactions | | | | |
| Total Transaction Summaries | | | | |
|   Total Number of Transactions Paid | | | | |
|   Statistics re: Amounts of All Transactions | | | | |
|   Statistics re: Dates/Times of All Transactions | | | | |
| Behavior | | | | |
|   Number of Transaction Look-Ups | | | | |
|   Performance Assessments | | | | |
| Comparisons to Entity's Historical Figures | | | | |
| Comparisons to Baseline Figures | | | | |

Figure 6

SYSTEMS AND METHODS FOR ASSESSING FRAUD RISK

CROSS-REFERENCE TO RELATED APPLICATIONS

The present application is a continuation of and claims priority to U.S. patent application Ser. No. 12/858,611, filed Aug. 18, 2010, entitled "SYSTEMS AND METHODS FOR ASSESSING FRAUD RISK," which is incorporated herein by reference for all purposes.

BACKGROUND OF THE INVENTION

Using a money-transfer system, money can be transferred between two people in two different locations. A money transfer company can have a number of agents, each of whom establish a site for money to be sent or received. Thus, a customer provides money (or other value) to be transferred at a sending site to be picked up by friend, colleague, or family at a receiving site. At this point, transaction information is entered into a record that is received at a money-transfer system hosted by the money transfer company. The record includes information that identifies the sending-site agent, the sender, the intended recipient, and the amount of money being transferred, among other things. The intended recipient then presents himself to a machine or representative at a receive site of a service provider or representative to obtain the transferred money or other value. A representative or machine at the receive site can verify and record the identity of the receiver and gives the receiver the value.

Money-transfer systems can involve many agents who may defraud the company or its customers. First, most money transfers involve transactions occurring at multiple locations hosted by different agents. Thus, an agent in charge of either the sending or receiving site may be involved in fraud. Further, each site involves a number of representatives who may also be involved in fraud. For example, various employees may receive money from customers, look up transactions identified by customers, and/or pay transferred money to customers. If an agent engages in fraudulent activity, either the customers or a money-transfer company may lose money. Therefore, it is advantageous to assess risk that an agent is or has engaged in fraudulent activity.

BRIEF SUMMARY

In some embodiments, a computer-implemented method of assessing a fraud risk is provided. The method can include: receiving data associated with a plurality of customer complaints. The data associated with each of the customer complaints can suggest that a money-transfer transaction did not complete as expected. And the data associated with each of the customer complaints can be associated with one or more of a plurality of money-transfer agents. The data related can be stored in a complaint database. A risk processor can be used to retrieve data associated with the money-transfer agent from the complaint database, and/or determine a fraud-risk index for the money-transfer agent based on the retrieved data.

The fraud-risk index may depend on any combination of the following: how many customer complaints are associated with the money-transfer agent, a length of time that the money-transfer agent has been associated with the company, money-transfer transactions not associated with any customer complaints with information suggesting that the transactions did not complete as expected, a time interval of the money-transfer transactions associated with the money-transfer agent, an amount of the money-transfer transactions associated with the money-transfer agent, and/or a transaction initiated after one or more of the money-transfer transactions associated with the money-transfer agent is paid. The money-transfer agent may include an employee associated with a money-transfer service company and/or a location of a money-transfer service company. The method may further include predicting that one or more of the plurality of money-transfer agents engaged in fraudulent activity based on the determined fraud-risk index associated with the one or more money-transfer agents. The method may further include using the risk processor to repeatedly re-determine the fraud-risk index for at least one of the plurality of money-transfer agents. In some embodiments, each re-determination is based on data associated with a different set of customer complaints. The method may further include associating data associated with each of the plurality of customer complaints with the one or more of a plurality of money-transfer agents.

In some embodiments, a computer system for assessing a fraud risk is provided. The system can include: a complaint-receiving component configured to receive data associated with a plurality of customer complaints, a data-storing component, and a risk processor. The data associated with each of the customer complaints at least suggests that a money-transfer transaction did not complete as expected. The data associated with each of the customer complaints can be associated with one or more of a plurality of money-transfer agents. The data-storing component can be configured to electronically store the data in a complaint database. And the risk processor can be configured to, for each of the plurality of money-transfer agents: retrieve data associated with the money-transfer agent from the complaint database, and/or determine a fraud-risk index for the money-transfer agent based on the retrieved data. The complaint-receiving component may include one or more of: a computer mouse, a computer keyboard, a microphone, and a network connection. The data-storing component may include a computer processor. The risk processor may include a computer processor. The output component may include a display.

The system may further include a processor configured to associate data associated with each of the plurality of customer complaints with the one or more of a plurality of money-transfer agents. The system may further include an output component configured to output one or more determined fraud-risk indices. The fraud-risk index may depend on how many customer complaints are associated with the money-transfer agent, a length of time that the money-transfer agent has been associated with the company, money-transfer transactions not associated with any customer complaints suggesting that the money-transfer transactions did not complete as expected, a time interval of the money-transfer transactions associated with the money-transfer agent, an amount of the money-transfer transactions associated with the money-transfer agent, and/or a transaction initiated after one or more of the money-transfer transactions associated with the money-transfer agent is paid.

The money-transfer agent may include a an employee of a money-transfer service company and/or a location of a money-transfer service company. The risk processor may be further configured to predict that one or more of the plurality of money-transfer agents engaged in fraudulent activity based on the determined fraud-risk index associated with the one or more money-transfer agents. The risk processor may be further configured to repeatedly re-determining the fraud-risk index for at least one of the plurality of money-transfer agents, wherein each re-determination is based on data associated with a different set of customer complaints.

BRIEF DESCRIPTION OF THE DRAWINGS

FIG. 5 shows examples of transaction information according to some embodiments of the invention.

FIG. 6 shows examples of agent-specific summary statistics according to some embodiments of the invention.

DETAILED DESCRIPTION OF THE INVENTION

Introduction

Figure 1:
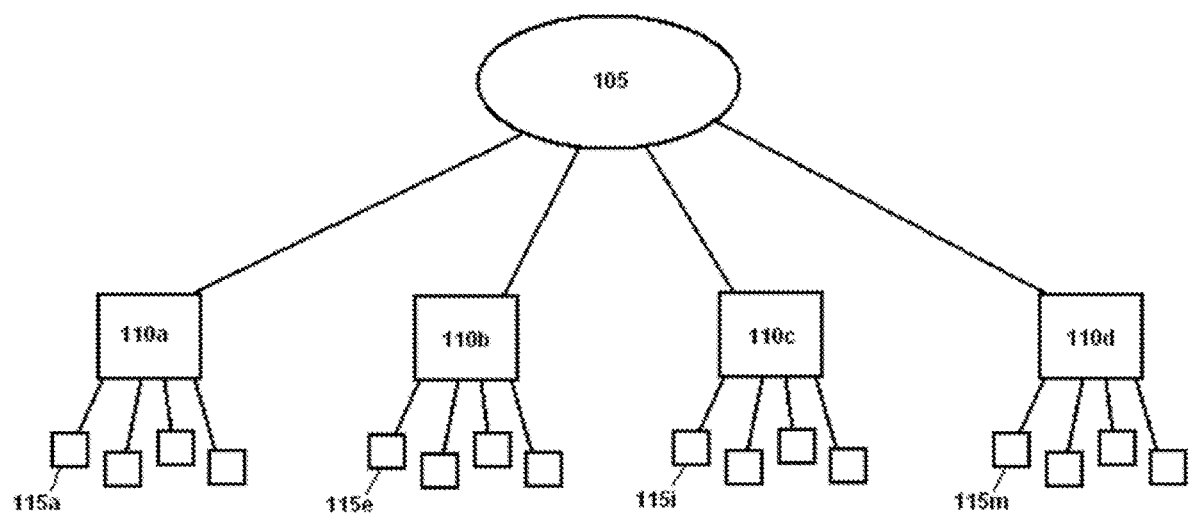
FIG. 1 shows a block diagram of a money transfer system that can be used by various embodiments of the invention.

In a money-transfer system, a number of suspicious occurrences may suggest that one or more involved parties were engaged in a fraudulent activity. For example, a customer may call to complain that the money intended to be transferred to him was apparently already disbursed to another individual or that he was told that there was no record of the transfer. Because money-transfer systems can involve a number of agents assisting in a high volume of money transfers, it can be difficult to assess which, if any, of these agents are involved in fraudulent activities. Further, the customers themselves may be involved, making it even more difficult to associate suspicious activity with any particular agents. To aid in solving this problem a fraud index can be calculated for agents that can be used to assess whether or not an agent is likely involved in fraudulent activity.

Assessing a fraud-risk involves a number of challenges, including the following. First, a mechanism for identifying circumstances suggesting that fraud did, or is likely to, occur may need to be established. For example, a customer-complaint system may be established. Not only is this venture costly, but it is likely that the system can be either under-inclusive or over-inclusive. Some customers may not report problems that were likely caused by fraud (either because they were unaware of the fraud risk or the problem itself). Other customers might report activities unrelated to fraud or falsify their claims.

Second, the situation (e.g., outlined in a complaint call) may need to be evaluated. This evaluation may allow the company to distinguish between complaints unrelated to potentially fraudulent activity from others and may suggest that a serious (very costly) fraudulent activity occurred. However, this evaluation may be difficult when a large number of fact-specific complaints are received.

Third, the company may then be able to associate the transactions from the customer complaints with company agents. In some instances, transaction information may indicate a number of agents involved, but in other circumstances, the information may be less complete. For example, perhaps a customer complained because a representative claimed that a transaction was initiated and took her money, but there was no record of the transaction. While the customer may be able to provide the location site she visited, she may be unable to identify the particular representative with whom she interacted. Additionally, even if a transaction was properly initiated, it may be difficult to identify all agents involved in the transaction. For example, a representative may overhear sufficient details about a transaction to then engage in fraudulent activity or he may use a computer system to obtain transaction information used for fraudulent activity.

Fourth, the company may identify an actual fraud risk associated with the reported events. In some instances, a reported event may be a result of a customer misunderstanding or of a customer's attempted fraudulent activity. Even if it were possible to not consider these reports, it would still be important to identify which agents were most likely to be involved in fraudulent activity, and how large of a risk of fraud that agent presented to the company. Because the circumstances underlying many potentially fraudulent activity are highly variable, it may be difficult to generate statistics across multiple events and/or to compare fraud risk across agents.

Other challenges may exist. Despite these challenges the embodiments disclosed herein provide systems and methods to assess a risk that an agent associated with a money transfer company is engaged in fraudulent activity. As used herein, a "money transfer company" or "company" is an entity that performs a financial service or transaction, such as a money transfer or the transfer of other value. (While the disclosure herein may refer to "money" transfers, embodiments also relate to transfers of other value.) An example of such a company is an entity, such as Western Union of Englewood, Colo., which provides a variety of such value transfer services. A service provider can be a "money services business". The company may act as an issuer, seller and/or redeemer of money orders; an issuer, seller and/or redeemer of traveler's checks; a money transmitter, a check casher; a currency exchanger; a currency dealer; and an issuer, seller and/or redeemer of stored value.

Money-transfer systems can involve many agents fulfilling various roles in the company. In some instances, an agent includes a site or entity associated with a money-transfer company. For example, an agent may include a specific money-transfer location.

In some instances, an agent includes a person directly or indirectly associated with the company. For example, as shown in FIG. 1, a number of agents 110 may be associated with a single money-transfer-service company 105. Each agent 110 may establish a location or site where customers may send or receive money. The agent 110 associated with each site may be, for example, an owner, a supervisor, or a manager of the site. In some embodiments, the agents' sites are individually owned and operated. In some embodiments, the money-transfer-service company owns and/or operates each site. At each site, one or more representatives 115 may be involved in money-transfer transactions. For example, a representative 115 may be employed by an owner of the site to interact with customers. Throughout this application, an "agent" may include a party associated with a particular site of the company (e.g., agent 110) and/or a representative 115. As noted above, in some embodiments, the analysis is extended to generally assess a fraud risk associated with a particular location. Thus, even if the agent 110 overseeing the location is not personally involved in fraudulent activity, the location may itself be identified as likely to be involved in fraudulent activities.

Due to the high number of agents and locations involved in money-transfer systems, it may be difficult to detect agents involved in fraud. Some embodiments disclosed relate to an automated or semi-automated determination that an agent was or was likely involved in a fraudulent activity. In some embodiments, a fraud-risk index can be calculated for each of one or more agents, which may relate to a probability that the agent was engaged in fraudulent activity. In some instances, the indices can be related to individual employees (e.g., interacting with customers involved in transactions). In some instances, the indices can relate to a company location (e.g., an office, a terminal or kiosk), which may have automated machines and/or employees to interact with customers involved in transactions. In some instances, the company location can be operated or supervised by a person or another company who may or may not be employed by the company operating the money-transfer system. In some embodiments, a company or person assessing fraud risk may be different from the company operating the money-transfer system.

Money-Transfer Systems

Examples of money-transfer systems include those generally described in U.S. Patent Application Publication Nos. 2004/0215558 (Ser. No. 10/658,844); 2004/0215574 (Ser. No. 10/424,558); and 2003/0167237 (Ser. No. 10/091,000), each of which is incorporated herein by reference in its entirety for all purposes.

Figure 2:
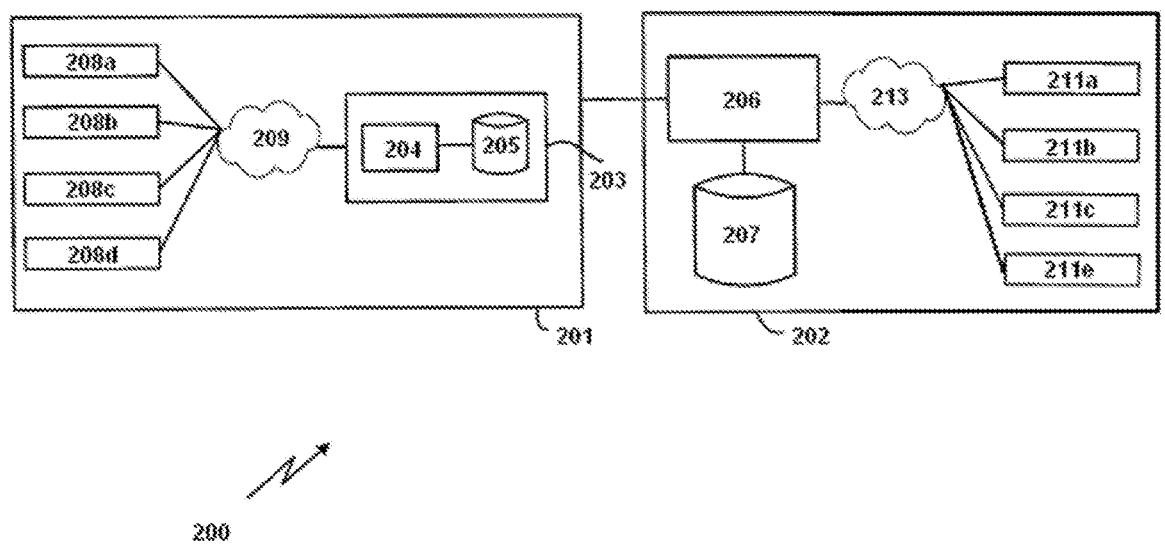
FIG. 2 shows a system for assessing a risk of fraud according to some embodiments of the invention.

FIG. 2 shows one embodiment of a risk-evaluation system 200 according to some embodiments of the invention. Risk-evaluation system 200 may comprise a risk-processing system 202 associated with a money-transfer system 201. Money-transfer system 201 may include a transaction-processing system 203 which comprises a transaction computer 204 coupled to a transaction database 205. Transaction computer 204 may include, for example, server computers, personal computers, workstations, web servers, and/or other suitable computing devices. Transaction database 205 may store transfer records comprising transaction information, each record relating to a single transaction.

Transaction-processing system 203 may include application software that programs transaction computer 204 to perform wire transfers. Transaction database 205 may be a storage device that includes solid-state memory, such as RAM, ROM, PROM, and the like, magnetic memory, such as disc drives, tape storage, and the like, and/or optical memory, such as DVD. Transaction-processing system 203 may be fully located within a single facility or may be distributed geographically, in which case a network may be used to integrate transaction-processing system 203. Many other examples are possible and apparent to those skilled in the art in light of this disclosure. Transaction computer 204 may include the hardware and software necessary to monitor, authorize, and process money transfers between two individuals.

For example, transaction computer 204 may be coupled to a network 209. Network 209 may be the Internet, an intranet, a wide area network (WAN), a local-area network (LAN), a virtual private network, any combination of the foregoing, or the like. Network 209 may include both wired and wireless connections, including optical links. In some embodiments, network 209 may be a transaction-processing network. Through network 209, transaction devices 208 may communicate with transaction-processing system 203, e.g., to relay or verify transaction information stored in transaction database 205. Transaction computer 204 may process data received and transmitted via transaction network 209. Information processed by transaction computer 204 may conveniently be stored in transaction database 205.

Money-transfer system 201 may include one or more transaction devices 208. For example, point-of-sale (POS) devices 208a may be located at company locations offering financial-transaction services. Examples of suitable POS devices are more fully described in U.S. Pat. No. 6,015,087, which is incorporated herein by reference in its entirety. Essentially, POS devices are terminals for receiving transaction information; e.g. money transfer information, and sending the information to the transaction-processing system 203. POS devices may include an input device such that a user can input data into the computer. The input device may include, for example, a computer mouse, a computer keyboard, or a microphone. The input device may also include a component configured to receive electronic data. For example, the input device may include a network connection, a disk drive, or a USB drive. Terminal identification information can be associated with each POS device 208a. Such identification information includes, but is not limited to, a physical location, a telephone number, a representative identification number, a terminal identification number, a security alert status, an indication of the type of terminal, a serial number of a CPU, an IP address, the name of a an agent, and the like.

Money-transfer system 201 also may include one or more computing devices 208b programmed to receive financial transaction information from individuals (e.g., customers). Like the POS devices 208a, computing devices 208b may be located at company locations.

Money-transfer system 201 also may include one or more consumer service representative (CSR) computers 208c located at company locations. The CSR computers 208c may be located, for example, at a call center operated by the company. The CSR computers 208c function and include components (e.g., input devices) much like the POS devices 208a and the computing devices 208b, except that transaction information is entered by a CSR who is receiving the information from a consumer by phone or over email, for example.

Money-transfer system 201 may also include one or more receiving sites 208d from which consumers may receive funds. The receive sites 208d may be locations equipped with a POS device 208a or computing device 208b. The receive sites 208d also may be automated teller machines, kiosks, merchant store fronts, bank accounts, or the like.

Risk-Processing System

Risk-evaluation system 200 may include a risk-processing system 202 to determine a risk that an agent was involved in a fraudulent activity. Risk-processing system 202 may include risk processor 206 and a fraud-risk database 207. Risk processor 206 may be any microprocessor-based device capable of retrieving transaction information relating to money transfers conducted by a particular agent. In one embodiment, risk processor 206 is configured to receive data related to customer complaints and/or customer-complaint reports.

Thus, risk-processing system 202 may include and/or risk processor 206 may be coupled to one or more reporting devices 211. The risk processor 206 may be coupled to report devices 211, for example, through network 213. Network 213 may be the Internet, an intranet, a wide area network (WAN), a local area network (LAN), a virtual private network, any combination of the foregoing, or the like. Network 213 may include both wired and wireless connections, including optical links. In some embodiments, network 213 may comprise a transaction-processing network. Through network 213, reporting devices 211 may communicate with risk processor 206, e.g., to receive customer-complaint information. Risk processor 206 may process customer complaints and store data from the complaints in fraud-risk database 207.

A reporting device 211 may include a POS device 211a located at company locations, such as a POS device described above with respect to POS device 208a. The POS devices 211a may be configured to receive customer-complaint information and/or transaction information (which may provide details relevant to the customer complaint).

A reporting device 211 may include a computing device 211b programmed to receive customer-complaint information from individuals (e.g., customers). The computing devices 208b may be located at company locations.

A reporting device may include, for example, one or more consumer service representative computers 211c. Report information may be entered by a CSR who is receiving the information from a consumer by phone or over email, for example.

A reporting device may include a consumer computer 211e. For example, risk processor 206 may be connected over the Internet to a consumer's home computer. The risk-processing system may include a server that may host a website that is configured to receive consumer complaints (e.g., by providing the consumer with a complaint form and accepting the completed forms).

In some embodiments, risk processor 206 is configured to access transaction database 205 and obtain transaction information stored therein. In these cases, risk-processing system 202 may be associated with money-transfer system 201 in any manner that allows for access to transaction database 205. Such association can be provided by direct wired communication between transaction database 205 and risk processor 206, by direct or network communication between money-transfer system 201 and risk processor 206, or by any other mechanism that provides risk processing system 202 with access to transaction database 205. In one particular embodiment, risk processor 206 is communicably coupled to transaction network 209 and accesses transaction database 205 via transaction computer 204. In another embodiment, risk processor 206 is directly coupled to transaction computer 204 and accesses transaction database 205 via transaction computer 204. It will be recognized by one of ordinary skill in the art that a number of other mechanisms exist within the scope of the present invention for providing access by risk processor 206 to transaction database 205.

Risk processor 206 may be configured to process transaction information retrieved from database 205 and/or from a reporting device 211 and store the processed information in fraud-risk database 207. In some instances, transaction information and/or complaint information is stored in fraud-risk database 207 without any processing of the information by risk processor 206 (e.g., risk processor 206 merely relays the information). Risk processor 206 may be configured to access information from one or both databases 205 and 207 and to process the information (e.g., by calculating a risk index associated with an agent, formatting the accessed information, formatting information received by a reporting device 211, or providing a risk index to a user).

In some embodiments, risk processor 206 may be a single computer, such as a personal computer or a database server. In other embodiments, risk processor 206 may be a group of two or more computers. In such embodiments, risk processor 206 may include a central computer associated with one or more peripheral computers. Such peripheral computers may be personal computers or portable devices, such as laptop computers and/or personal digital assistants.

Risk processor 206 may include a computer-readable medium capable of maintaining instructions executable to perform the functions associated with risk processor 206. For example, as more fully described below, the computer-readable medium may comprise software that allows risk processor 206 to access the information stored in fraud-risk database 207 and/or transaction database 205 and calculate a fraud-risk index.

The computer-readable medium can be any device or system capable of maintaining data in a form accessible to risk processor 206. For example, the computer-readable medium can be contained in a hard-disk drive either integral to risk processor 206 or external thereto. Alternatively, the computer-readable medium can be contained in a floppy disk or a CD-ROM apart from risk processor 206 and accessible by inserting into a drive (not shown) of risk processor 206. In yet other alternatives, the computer-readable medium can be contained in RAM integral to risk processor 206 and/or a microprocessor (not shown) within risk processor 206. One of ordinary skill in the art will recognize many other possibilities for implementing the computer readable medium. For example, the computer-readable medium can be in a combination of the aforementioned alternatives, such as, a combination of a CD-ROM, a hard disk drive and RAM.

Examples of Fraud

Figure 3:
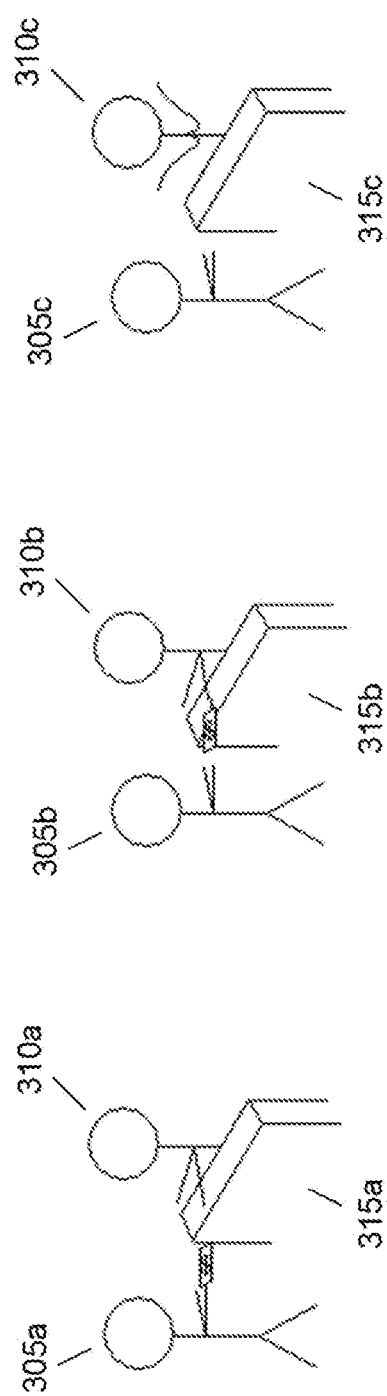
FIG. 3 shows an example of a situation suggesting that a fraudulent activity occurred according to some embodiments of the invention.

Risk processor 206 may be configured to determine a risk that an agent is engaging or has engaged in fraudulent activity. FIG. 3 shows one example of a paid-in-error situation that may suggest that an agent was involved in fraudulent activity. A first individual 305a initiates a transaction by providing a first company agent 310a (e.g., a representative 115) with a payment (e.g., comprising an amount of money to be transferred and a transfer fee) at a first company location 315a. First agent 310a may then access transaction computer 204 and send it information about the transaction, which the transaction computer 204 may store in transaction database 205. The first agent 310a may access transaction computer 204 by using a point-of sale device 208a at the first location 115a. The point-of-sale device 208a may be specifically designed for money-transfer transactions. The device may be operated by an agent. In another case, the information may be sent using a computing device at first location 115a running application software specifically designed for money-transfer transactions. In yet another case, the information may be sent by phone when an agent contacts a consumer service representative (CSR) of the company. The agent is able to verify the sender's information and collect funds while the CSR enters the information into a transaction record.

A second individual 305b may provide transaction-identifying information to a second agent 310b and request the money associated with the transaction at a second location 315b. Second agent 310b may look up the transaction and request that second individual 305b provide personal identifying information (e.g., a driver's license or a passport) to prove that he is the intended recipient of the transaction. Second agent 310b may look up the transaction, for example, by using a point-of-sale device 208a at the second location 115a, using a computing device at the second location 115a running application software designed for money-transfer transactions, or contacting a CSR of the company.

In some instances, a third individual 305c may request the money associated with the same transaction from a third agent 310c at a third location 315c. The third agent 310c may access the transaction computer 204 (e.g., in a manner similar to one or more of those described above with respect to the second agent's transaction look-up) and determine that the transaction has already been paid. Thus, the third individual 305c may be denied payment or the company may decide to nevertheless pay the third individual 305c (thereby likely losing money for the transaction). The third individual may then complain to the company, e.g., using a reporting device 211, and a customer-complaint report may be generated (e.g., by risk processor 207).

When second individual 305b is not the intended recipient but nevertheless receives the transferred money, a paid-in-error transaction error occurred. The transaction error may result, for example, from second individual 305b providing false personal identifying information and/or from erroneous actions of company agents. For example, first agent 310a may inform second individual 305b about the details of the transaction, such that he may collect the transferred money from second agent 305b at second location 315b. As another example, third agent 310c may wrongly deny the transferred money to third individual 305c and may then inform second individual 305b about the details of the transaction, such that he may collect the transferred money from second agent 305b. As another example, second agent 310b may (e.g., selectively) not require second individual 305b to provide identifying information.

In some embodiments, one or more agents are involved in receiving payments, initiating transactions, disbursing payments, verifying identifying information, and/or looking up transactions (as shown in FIG. 3). In some embodiments, no agents are involved in one or more of these processes. For example, a transaction may be initiated and payment may be received from a kiosk. While FIG. 3 shows a single agent being involved in various transaction steps, in some embodiments, multiple agents are involved. For example, when the first individual initiates the transaction and provides payment, agents involved may include: an agent who receives the payment, an agent who inputs the payment into the computer system, an agent who is working at the time of the transaction initiation though not directly involved in the transaction, and/or a supervising agent. In some embodiments, one or more of the first, second and third agents may comprise the same agent, and/or one or more of the first, second and third locations may comprise the same location.

Another example of fraudulent agent activity includes a circumstance where a person was convinced (e.g., by an agent or representative associated with an agent) that they would receive something of value (e.g., a credit card, a grant, an inheritance, an stock option, a loan, a lost article, recovered funds from victimization in a previous fraud scheme, a property to rent, or lottery winnings) if they transferred money (e.g., for a supposed annual fee, taxes, attorney fees, investment money, months of loan payment, a reward, fees to defray costs, or a deposit) in advance, even though the person would later not receive the expected thing of value. Similarly, a person may be convinced to transfer money to facilitate transporting a relative across a border, even though the recipient would not later facilitate the transportation. A person may be convinced to transfer money to assist a relative or (online) acquaintance in a perceived emergency situation (e.g., where the person believed he was transferring money for bail or medical expenses), even though the relative or acquaintance was not in the emergency situation. A person may transfer money in an attempt to purchase merchandise or an event ticket, even though such merchandise or ticket would not later be provided. A person may receive a counterfeit check or money order (e.g., from an agent or representative associated with an agent) and be asked to send a money transfer for overpayment. A person may be convinced that he is a mystery shopper and must evaluate a money-service transfer company by sending a transfer. A person may receive a counterfeit prepayment or deposit for renting a property or time share and be asked to return the money because the initial sender asserted that his plans had changed such that he would no longer be renting the property.

Errors (e.g., the paid-in-error situation described with respect to FIG. 3) may suggest that an agent was involved in a fraudulent activity. However, due to the number of agents involved, it may be difficult to determine which agent/s were to blame.

Fraud-Risk Determination Process

Where the Information is Received

Figure 4:
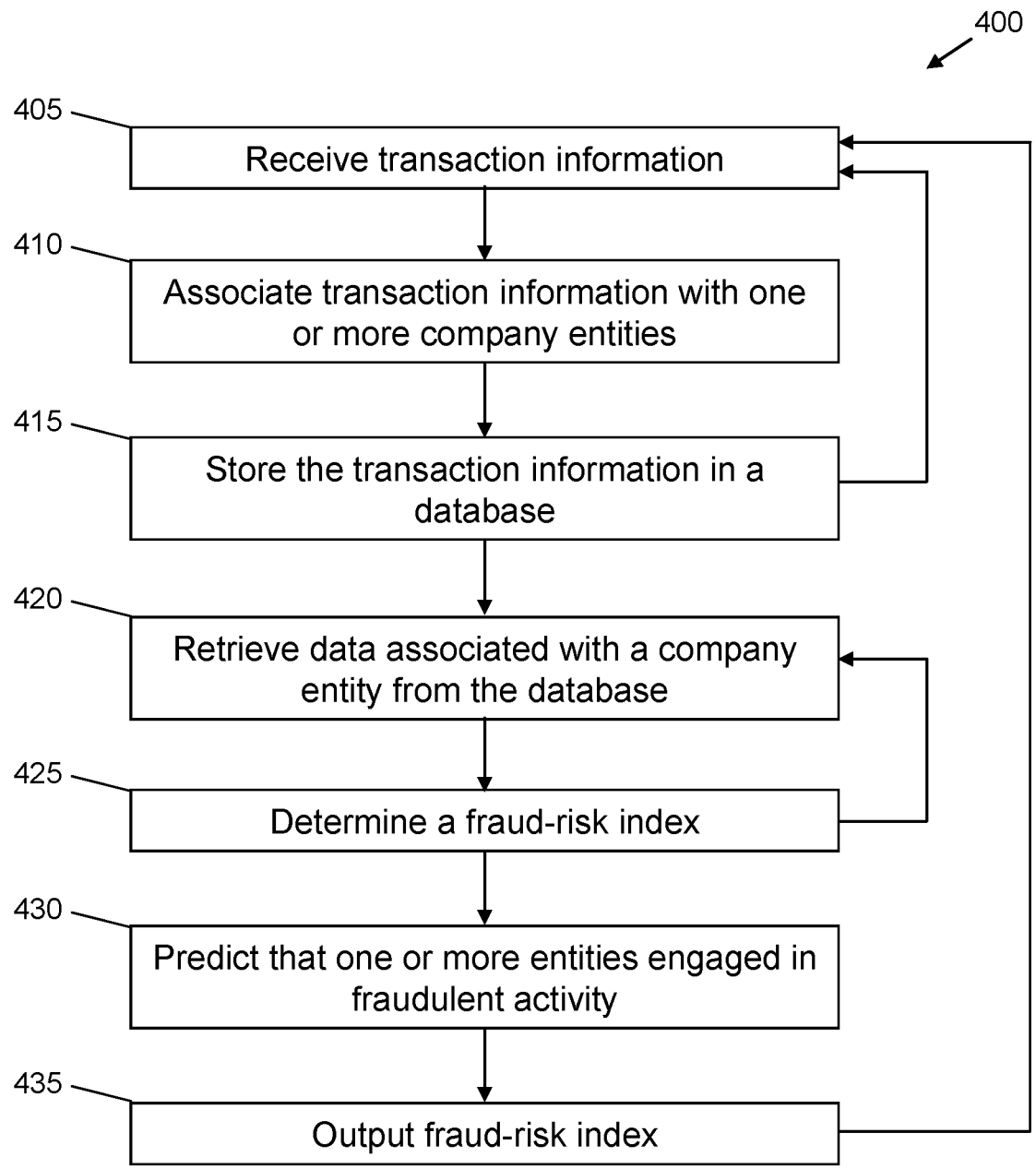
FIG. 4 shows a process for assessing a risk of fraud according to some embodiments of the invention.

In some embodiments, transaction information associated with one or more company agents is analyzed to determine a fraud-risk index and to predict that specific agents associated with a money-transfer transaction are engaged in fraudulent activity. An embodiment of a process 400 for determining a fraud-risk index is shown in FIG. 4. Transaction information is received at 405. The transaction information may be received, for example, by accessing fraud-risk database 207, receiving information from a reporting device 211 (e.g., over network 213), and/or by accessing transaction database 205.

The transaction information may suggest that an agent involved with a transaction was engaged in fraudulent activity. The transaction information may indicate that the transaction did not complete as expected (e.g., the intended recipient was unable to receive money transferred or that an individual attempted to receive the transferred money after it was already disbursed). In some embodiments, some of the transaction information (e.g., information associated with a first set of transactions) suggests that fraudulent activity by involved agents, and some of the transaction information (e.g., information associated with a second set of transactions) does not suggest fraudulent activity by involved agents.

In some embodiments, customer-complaint data comprises transaction information. For example, a customer may call a call center to complain about a particular transaction, and he may provide details related to the transaction at issue. In some embodiments, transaction information comprises customer-complaint data. For example, transaction information may include information related to a transaction, the information provided by a customer, as well as information obtained from a database.

In some embodiments, a report comprises customer-complaint data and/or transaction information. The report may be initiated by a customer or may comprise a customer complaint. In some embodiments, the report is generated by the customer (e.g., by completing an online form or a satisfaction survey at a company terminal). In some embodiments, the report is generated by a company representative (e.g., a CSR) in response to a customer complaint (e.g., a CSR generates the report using a computer in response to a customer complaint received over the telephone, online or at a company location). A customer may be prompted or required (e.g., using form fields or questions asked by a company agent) to provide specific types of transaction information, such as any of the types described below with respect to FIG. 5. The report, data from the reports, and/or customer-complaint data may be stored in fraud-risk database 207.

In some embodiments, the transaction information is automatically received (e.g., through network 209 and transaction-processing system 203) after a transaction action has occurred. For example, transaction information may be sent from a transaction device 208 over network 209 to transaction-processing system 203 coupled to risk processor 206. This transmission of information may occur, for example, after or while first individual 305a initiates a money transfer, second individual 305b receives a money transfer, third individual 305c attempts to but fails to receive a money transfer (e.g., because the money has already been disbursed), an agent (e.g., second agent 310b or third agent 310c) looks up details about the money transfer in a company system, or an individual looks up details about the money transfer in a money-transfer system made available to customers.

In some embodiments, some transaction information relating to a single transaction is initially provided by a customer (and, e.g., received from a reporting device 211 or fraud-risk database 207) and some transaction information relating to the same transaction is accessed through transaction database 205. For example, a customer may provide a transaction identification number, and then detailed information pertaining to that transaction (e.g., where, when, and by whom money was sent; where and when the money was paid; which agents or locations participated in the transfer; the amount of the transfer; etc.) may be received from transaction database 205. In some embodiments, some transaction information relating to a single transaction is provided by a customer and some transaction information relating to the same transaction is provided by a company computer system or by a company representative. For example, a company representative may supplement a customer-complaint report to indicate how the company responded to the complaint. As another example, a computer system may supplement a report to indicate which agents looked up the transaction in question and when these lookups occurred (e.g., by looking up the information in transaction database 205).

In some instances, transaction information relating to some transactions is provided by a customer (e.g., during a customer complaint) and transaction information relating to other transactions is not provided by the customer. For example, a company may track both transactions associated with customer complaints or reports and transactions that were paid-in-error to a second individual rather than to the third. The company may be alerted (e.g., automatically) about the paid-in-error transactions when the third individual 305c attempts to receive the transferred money. The company may, for example, generate a report for any or all incidences (e.g., relating to suspicious or fraudulent activity), even when such reports do not correspond to a customer complaint.

Types of Information

FIG. 5 shows an example of types of transaction information that may be received at 405 and/or included in fraud-risk database 207. The transaction information may include transaction-send information. The transaction-send information may include a date or time when the money was transferred from first individual 305a, a first location 315a (e.g., a geographic location or a location of a particular company location, office, kiosk or terminal) where the transaction was initiated or where payment was accepted from first individual 305, an agent (e.g., a representative 115) involved in sending money (e.g., first agent 310a receiving cash or processing a check, credit-card or money-order payment), or identifying information about first individual 305a sending the money (e.g., a name, customer ID number, account number, or an address). The transaction-send information may include transaction instructions (e.g., regarding when, where, and to whom the money was to be transferred).

The transaction information may include transaction-pay information. The transaction-pay information may include a date or time when the transferred money was paid to second individual 305b, a second location 315b (e.g., a geographic location or a location of a particular company location, office, kiosk or terminal) where money was disbursed to second individual 305b, an agent (e.g., a representative 115) involved in paying second individual 305b (e.g., second agent 310b providing the second individual with cash, a check or another form of payment), or identifying information about second individual 310b (actually or allegedly) receiving the money (e.g., a name, customer ID number, account number, or an address). The transaction information may include a send-pay duration, which may comprise a duration between a time when a transaction was initiated and/or payment from a first individual was accepted and a time when transferred money was paid.

The transaction information may include attempted-retrieval information. The attempted-retrieval information may include a date or time when third individual 305c attempted to receive payment for the transaction, a third location 315c (e.g., a geographic location or a location of a particular company location, office, kiosk or terminal) where third individual 305c attempted to receive payment, an agent (e.g., a representative 115) involved in the attempted retrieval (e.g., third agent 310c who denied the third individual from being able to receive the transferred money), or identifying information about third individual 305c (e.g., a name, customer ID number, account number, or an address). The date/time of attempted retrieval may be before and/or after the date/time when the transaction was paid. For example, third individual 305c may request money associated with a particular transaction, and third agent 305c may refuse to pay the money to third individual 305c, indicating that the transaction has not been processed yet. Second individual 305b (who, in some instances, may be the same person as the third individual 305c) may then be paid the transferred money at a later date/time. In some embodiments, there are more than one attempted retrievals. Information associated with each attempted retrieval may be included in the transaction information.

The transaction information may include subsequent matching activity, which may include a second transaction following and relating to the "first" transaction associated with the information or report. For example, the subsequent matching activity may include a transaction involving an individual 305 who was also involved in the first transaction. The subsequent matching activity may include a second transaction involving a transaction amount relating to or being the same as a transaction amount of the first transaction. The subsequent matching activity may include a transaction occurring within a time interval (e.g., 1, 5, 10, 30 or 60 minutes or 1, 2, 4, 8, 24, 48, or 84 hours) of the first transaction. The subsequent matching activity may include an inter-country transaction. For example, a subsequent matching activity may include a second transaction initiated by an individual who received payment from the first transaction (e.g., initiated by second individual 305b), the second transaction being initiated within 24 hours from the payment of the first transaction. In some instances, transaction information merely indicates that subsequent matching activity has been identified. In some instances, transaction information includes information about the subsequent matching activity (e.g., relating to the second transaction).

The transaction information may include resolution information. The resolution information may indicate whether the intended recipient of the transaction (e.g., third individual 305c) was compensated (e.g., whether the full transaction amount was provided to the third individual). The resolution information may indicate whether an agent (e.g., agent 310a, 310b or 310c) was required to pay for compensation to the intended payee or for a penalty. For example, a company representative or system may determine that an erred transaction was due to an agent's mistake or misconduct (e.g., failing to require that the individual requesting the money provide identification), and thus, the agent may be required to pay the full transaction amount such that the intended recipient may be paid ("a chargeback"). The transaction information may indicate whether such a chargeback occurred and/or other information (e.g., the amount of the chargeback or the basis of requiring the chargeback) associated with the chargeback.

The transaction information may include a transaction amount, which is the amount that was or was intended to be transferred from the first individual to the intended recipient. The transaction information may also include amounts of fees.

In some embodiments, the types of transaction information received varies across associated transactions. For example, third individual 305c may have attempted to receive (but been denied) transferred money for a first set of transactions, but there may not have been any such failed attempts for a second set of transactions. Thus, transaction information associated with the first set of transactions may include attempted retrieval information, while transaction information associated with the second set of transactions may not.

Associating Information with Agents

Returning to FIG. 4, at 410, transaction information is associated with one or more company agents. A company agent may, for example, comprise a representative or employee (e.g., merchant) associated (directly or indirectly through an intermediate company) with the company (e.g., 115), an agent associated with a particular money-transfer site (e.g., 110) or financial institution that interacts with consumers (e.g., at a remote location in a money-transfer process) and/or a company location (e.g., associated with a company office, a company kiosk or a company terminal), which may, for example, be configured to allow consumers to remotely partake in a money-transfer process. In one embodiment, the transaction information is associated with first agent 310a who interacted with first individual 305a during initiation of the transaction, with second agent 310b who interacted with second individual 305b while providing second individual 305b with transferred money associated with the transaction, with third agent 310c who interacted with third individual 305c during third individual's attempt to receive the transferred money, and/or with an agent who looked up the transaction on a company computer system. In one embodiment, the transaction information is associated with first location 315a where first individual 305a initiated the transaction, with second location 315b where transferred money associated with the transaction was provided to second individual 305b, with third location 315c where third individual 305c attempted to receive the transferred money, and/or with an agent (e.g., a supervising employee or branch owner) associated with one or more of these locations.

In one embodiment, the transaction information is associated with each agent who was directly involved with the transaction at issue (e.g., agents 310a-310c). Directly involved agents may include agents who interacted with one or more of the involved individuals 305a-305c. In one embodiment, the transaction is associated with one or more agents indirectly involved with the transaction (e.g., an employee who was on-the-clock working for the company at the time that individual 305a, 305b or 305c interacted with company agent, but who was not directly involved in the interaction, or an supervising agent).

Storing Information in a Database

At 415, transaction information is stored in a database (e.g., fraud-risk database 207 and/or transaction database 205). In some embodiments, the transaction information is formatted or processed (e.g., by risk processor 207 and/or transaction computer 204) before it is stored in the database.

In some embodiments, the database comprises a plurality of entries, each entry being associated with one transaction and/or with one report (e.g., each entry being automatically generated after a transaction initiation, completion or unsuccessful retrieval attempt, or each entry being associated with one customer complaint or report), and each entry comprising transaction information associated with that transaction. (See, e.g., FIG. 5.) Each transaction entry may be linked to the one or more agents associated with the transaction in 410. In some embodiments, new entries are added to the database following triggering events (e.g., a new customer complaint or a transaction initiation, completion or unsuccessful retrieval attempt). In some embodiments, new entries are added to the database at particular time points. In some embodiments, selected entries are removed from the database. For example, entries may be removed if they have been in the database for over a threshold amount of time or if they were entered prior to a threshold date. As another example, entries associated with transactions determined to be or determined to likely be non-fraudulent may be removed. As another example, entries associated with transactions of amounts below a threshold may be removed.

Agent-Specific Summary Statistics

In some embodiments, the database (e.g., risk-fraud database 207) includes agent-specific summary statistics. For example, the database may include a plurality of entries, each entry being associated with one agent. In some embodiments, agent-specific summary statistics are determined based on transaction information (e.g., stored in transaction database 205 and/or risk-fraud database 207). Examples of agent-specific summary statistics are shown in FIG. 6.

In some embodiments, agent-specific summary statistics include summary statistics about reports and/or customer-complaint data associated with the agent. The reports or complaint data associated with the agent may include all reports or complaint data (across all time or within one or more time periods) associated with the agent or a subset of the reports or data. For example, a subset of the reports may include only those reports where the agent was directly interacting with a customer, where the agent was involved in a payout of the transaction, where a customer filed a complaint, or where another agent was not determined to be the cause of a transaction error. As further examples, a subset of the reports may include reports associated with a particular type of error (e.g., reports corresponding to incidences where it was determined that a paid-in-error error occurred) or reports associated with a particular resolution (e.g., reports associated with an agent chargeback).

Complaint summary statistics may include a number (or count) of received reports, received complaints, paid-in-errors errors, chargebacks, or determined suspicious transactions (across all time or within one or more time periods) associated with the agent. The report-number statistic may include, for example, a number of fraud-related customer complaints received or a number of paid-in-error reports.

The complaint summary statistics may include a transaction-amount statistic related to amounts of the transactions associated with the received reports, received complaints, or determined suspicious transactions. The transaction-amount statistic may include, for example, an average, median, mode, maximum, standard deviation, or cumulative sum of the transaction amounts. The transaction-amount statistic may relate to a distribution of digits (e.g., distribution of first digits) in transaction amounts across transactions. For example, the transaction-amount statistic may relate to a comparison (e.g., a cumulative paired difference) between the proportion of leading-digits of agent-associated transactions (either including only transactions identified in complaints or including a total number of transactions) equal to each individual digit and the proportions predicted by a model. The model may be based, for example, on an empirical distribution of digits or may be obtained by analyzing other transactions. The model may predict an even distribution of digits across numbers. The model may be based on Benford's law, which would predict that the probability of observing a leading digit is equal to $\log_{10}(1+1/d_1)$, with $d_1$ being equal to an integer between 1 and 9. Thus, Benford's law would predict that the following probability distribution with regard to a leading digit:

| Leading Digit | Probability |
|---|---|
| 1 | .3010 |
| 2 | .1760 |
| 3 | .1250 |
| 4 | .0970 |
| 5 | .0790 |
| 6 | .0670 |
| 7 | .0580 |
| 8 | .0510 |
| 9 | .0460 |

The complaint summary statistics may include a transaction-date/time statistic related to a date and/or time of transactions associated with the received reports, received complaints, or determined suspicious transactions. The transaction-date/time statistic may indicate, for example, that most of reports were recent or that reports associated with the agent were being filed with increasing frequency. The transaction-date/time statistic may relate to the duration of time between the time that a transaction was initiated (and/or money was paid by first individual 305a) and the time that a transaction was paid (to second individual 305b) (a send-pay duration). The transaction-date/time statistic may include, for example, an average, median, mode, or minimum duration and/or a percentage of report-identified transactions with durations below a threshold (e.g., 1, 5, 10, 15, 30 or 60 minutes or 2, 4, 8, 24 or 48 hours).

The complaint summary statistics may include statistics related to resolution information associated with the received reports, received complaints, or determined suspicious transactions. For example, the complaint summary statistics may indicate a number or percentage of reports or complaint data associated with the agent where an intended recipient was compensated or where the agent was responsible for paying the compensation (e.g., creating a chargeback situation) or a fee. The complaint summary statistics may include statistics related to subsequent matching history. For example, the complaint summary statistics may indicate a number or percentage of reports where a person or computer system determined that a second transaction was matched to the first one (e.g., due to a small time window between the transactions, the same or similar amount transferred in the transactions, a common involvement of a single individual, and/or a transfer to a recipient in a different country).

In some embodiments, agent-specific summary statistics include summary statistics about all transactions (across all time or within one or more time periods) associated with the agent or a subset of the total transactions (e.g., only including reports where the agent was directly interacting with a customer, where the agent was involved in a payout of the transaction, or where another agent was not determined to be the cause of a transaction error). These statistics may, for example, parallel at least some of the complaint summary statistics. For example, the total-transaction summary statistics may include a number (or count) of transactions, a transaction-amount statistic and/or transaction-date/time statistic, as described above, but with respect to a set of total transactions rather than, for example, agent-associated transactions from complaints.

In some embodiments, agent-specific summary statistics include statistics comparing variables related to complaint-associated transactions to variables related to total transactions. For example, the relative statistics may include a number of transactions associated with an agent and identified in a report (e.g., the reports being associated with customer complaints, paid-in-error errors and/or agent chargebacks) divided by a number of total transactions associated with the agent. As another example, the relative statistics may include a cumulative transaction amount of transactions associated with an agent and identified in a report (e.g., the reports being associated with customer complaints, paid-in-error errors and/or agent chargebacks) divided by a cumulative transaction amount of total transactions associated with the agent.

In some embodiments, agent-specific summary statistics include behavior statistics. For example, the behavior statistics may include a number of times that the agent looked up a transaction (e.g., in transaction database 205). The look-up number may be absolute across a period of time or may include look-ups that were not accompanied by a pay-out or look-ups associated with a transaction later at issue in a report, customer complaint, or determined-to-be or likely-to-be fraudulent incident. The behavior statistics may include a proportion of an agent's look-ups that was accompanied by a pay-out. The behavior statistics may include performance assessments, such as how frequently an agent was late to work or absent from work or how satisfied supervisors or customers were with the agent's job performance.

In some instances, an agent-specific summary statistic is generated using a step function. For example, an agent-specific summary statistic (e.g., a percentage of total transactions identified in a complaint, a proportion of look-ups accompanied by a pay-out, a percentage of send-pay intervals above a threshold, or a number of incidences where the agent was identified as a fraud risk) may be set to zero when the statistic is below a particular value (e.g., below 1, 5, 10, 20, 25 or 50 percent or below a count of 2, 3, 4, 5, 10 or 15).

In some embodiments, agent-specific summary statistics include statistics related to the agent's history with the company. For example, the company-history statistics may include the agent's current or historical position or salary, the date that the agent started working with the company, the date that the agent started working at his current position, the date that the agent started working at his current location, how long the agent has been working with or associated with the company, how long the agent has been working at his current position, or how long the agent has been working with the company at his current location. In one embodiment, a start-date multiplier is calculated based on how long the agent has been working with or associated with the company. The start-date multiplier may be calculated based on an equation and/or a step function. For example, the start-date multiplier may be equal to:

$$s = \begin{cases} 1 & \text{if } \Delta t > 420 \\ (1 - \Delta t/420) \cdot 0.2 + 1 & \text{if } \Delta t \leq 420 \end{cases} \quad \text{(Eqn. 1)}$$

where $\Delta t$ is the duration (in days) since the time that the agent has been working or associated with the company. Thus, if the agent just started with the company, $\Delta t$ would be 0, and the start-date multiplier would be 1.2. If the agent has been associated with the company for over 420 days (~14 months), the –multiplier would be 1. The start-date multiplier could be multiplied with one or more other terms used in the fraud-risk index calculation.

The company-history statistics may also relate to previous incidences that the agent has had at the company. These incidences may include, for example, being investigated for possible fraud, being identified as a fraud risk, having the company determine the agent was or was likely to have been involved in fraud, or being fined by the company. The statistics may relate to, for example, the number of such incidences or a severity of the incidences (e.g., related to the number of transactions or the amounts involved in the transactions from previous fraud investigations).

In some embodiments, agent-specific summary statistics include combinations of the above examples. For example, an agent-specific summary statistic may indicate whether the percentage of compensated complaints was higher for recently complaints than for older complaints, thus combining data analyzed for the transaction-time statistic and for the compensated-complaint statistic.

Historical-Comparison Statistics

In some embodiments, agent-specific summary statistics include comparisons of one or more of the above-described statistics (e.g., a complaint-number statistic, a customer-complaint-number statistic, a paid-in-error-number statistic, a chargeback-count statistic, or a transaction-amount statistic) to one or more similar statistics from the agent's past. For example, in one embodiment, the agent-specific summary statistics includes a number of statistics related to agent-associated transactions occurring over a prior month. Similar statistics could be presented for previous time periods (e.g., from one, two, three and/or four months before the past month, from last year, etc.). In some instances, agent-specific summary statistics include historical comparison statistics, such as a ratio or a weighted ratio of a statistic characterizing "current" transactions (e.g., occurring over the past month) to similar statistics derived from prior transactions.

For example, suppose that $L_1$-$L_4$ represents monthly values for one statistic (e.g., a number of complaints associated with an agent filed within the month), with $L_4$ representing the statistic for previous month, $L_3$ representing the statistic for the month before the previous month, etc. The following equations represent possible agent-specific summary statistics for this statistic:

$$L_{sum} = \frac{w_1 \cdot L_3 + w_2 \cdot L_4}{w_1 \cdot L_1 + w_2 \cdot L_2} \quad \text{Eqn. 2}$$

$$L_{sum} = \frac{w_1 \cdot L_2 + w_2 \cdot L_3 + w_3 \cdot L_4}{w_1 \cdot L_1 + w_2 \cdot L_2 + w_3 \cdot L_3} \quad \text{Eqn. 3}$$

$$L_{sum} = \frac{w_1 \cdot \frac{L_2}{L_1} + w_2 \cdot \frac{L_3}{L_2} + w_3 \cdot \frac{L_4}{L_3}}{w_1 + w_2 + w_3} \quad \text{Eqn. 4}$$

where $w_1$, $w_2$ and $w_3$ represent weighting factors. For example, in one instance, $w_1$, $w_2$ and $w_3$ are all equal to 1. In one instance, $w_1=1$, $w_2=2$, and $w_3=3$. In one instance, $w_1=1$, $w_2=2$, and $w_3=4$. In some instances the weighting factors depend on other variables. For example, if L represents a transaction-amount statistic, the weighting factors may depend on the number of complaints received in the previous months.

These equations may be modified in circumstances, for example, for which an agent has not been with a company for at least four months or when an agent did not partake in transactions for given months. For example, the equations below show possible modifications to Eqns. 2-4 for a situation in which an agent was not with the company for the month corresponding to $L_1$.

$$L_{sum} = \frac{w_1 \cdot L_3 + w_2 \cdot L_4}{(w_1 + w_2) \cdot L_2} \quad \text{Eqn. 5}$$

$$L_{sum} = \frac{(w_1 \cdot L_2 + w_2 \cdot L_3 + w_3 \cdot L_4) \cdot (w_2 + w_3)}{(w_2 \cdot L_2 + w_3 \cdot L_3) \cdot (w_1 + w_2 + w_3)} \quad \text{Eqn. 6}$$

$$L_{sum} = \frac{w_2 \cdot \frac{L_3}{L_2} + w_3 \cdot \frac{L_4}{L_3}}{w_2 + w_3} \quad \text{Eqn. 7}$$

As further examples, the following equations show possible modifications to Eqns. 2-4 for a situation in which an agent was not with the company for the months corresponding to $L_1$ and $L_2$.

$$L_{sum} = \frac{w_1 \cdot L_3 + w_2 \cdot L_4}{(w_1 + w_2) \cdot L_3} \quad \text{Eqn. 8}$$

$$L_{sum} = \frac{(w_2 \cdot L_3 + w_3 \cdot L_4) \cdot w_3}{w_3 \cdot L_3 \cdot (w_2 + w_3)} \quad \text{Eqn. 9}$$

$$L_{sum} = \frac{L_4}{L_3} \quad \text{Eqn. 10}$$

In some instances, rather than modifying the equations when an agent was not with the company for past months, a baseline value could be substituted for the missing statistic. The baseline value could be determined, for example, based on extrapolation of statistical values (e.g., from the specific agents or across a group of agents).

In some embodiments, agent-specific summary statistics include comparisons of one or more of the above-described statistics to baseline figures. The baseline figures may relate to, for example, similar statistics from all agents or a subset of agents (e.g., representatives in a similar position and with similar experience to the agent). For example, for a single statistic, the baseline figure may be or may relate to an average, a weighted average, a median, a mode, a maximum threshold (e.g., an average plus one, two or three standard deviations), or a standard deviation of the same statistic across all agents or the subset of agents. In some instances, the baseline figures are only included when the agent is relatively new (e.g., having been with the company, at his current position or at his current location for less than one, two, three, six, or twelve months). In some instances, agent-specific summary statistics include baseline comparison statistics, such as a ratio or a weighted ratio of a statistic to a similar baseline statistic (e.g., derived from statistics from other agents).

In some instances, risk-fraud database 207 includes both complaint summary statistics and agent-specific summary statistics. In some instances, risk-fraud database 207 includes either complaint summary statistics or agent-specific summary statistics. The other group of statistics may not be determined, may not be stored in a database, or may be stored in a different database (e.g., a database not shown in FIG. 2). In some instances, risk-fraud database 207 includes complaint data distinct from the complaint summary statistics (e.g., a written complaint from a customer or a vocal recording from the customer).

As shown in FIGS. 4, 405, 410 and 415 may be repeated. For example, risk processor 206 may be configured to repeatedly receive transaction information. Thus, upon the arrival of new transaction information (e.g., due to a new transaction, customer complaint or suspicious transaction), the received information may be associated with one or more agents and stored in a database. In some instances, the process only continues on to 420 when, for example, there is a specific instruction to continue the process, when a certain time has been reached (e.g., the start of a new month), or a specific type of transaction information was received (e.g., a new customer complaint).

Retrieval from Database

At 420, data associated with an agent are retrieved from the database. In some embodiments, agent-specific summary statistics are retrieved. In some embodiments, complaint summary statistics are retrieved. In some embodiments, complaint (non-summary) data are retrieved. The data may be retrieved from fraud-risk database 207 and/or from transaction database 205. In one embodiment, complaint data and/or at least some complaint summary statistics are retrieved from fraud-risk database 207 and data related to transactions associated with the complaints are retrieved from transaction database 205. The data may be retrieved by risk processor 206.

In one embodiment, complaint summary statistics are stored in fraud-risk database 207. Risk processor 206 accesses the complaint summary statistics and, in some instances, supplements the complaint summary statistics with transaction information stored in transaction database 205. Risk processor 206 processes the retrieved data and generates agent-specific summary statistics, which may or may not be subsequently stored in a database (e.g., fraud-risk database 207).

Determine Fraud-Risk Index

At 425, a fraud-risk index is determined (e.g., by risk processor 207). The fraud-risk index may at least partly depend on one or more agent-specific summary statistics. The fraud-risk index may include, for example, a weighted average of a set of agent-specific summary statistics. In some instances, transaction information stored in a database is retrieved, agent-specific summary statistics are determined (which may or may not be subsequently stored in a database), and a fraud-risk index is determined based on the agent-specific summary statistics. In some instances, agent-specific summary statistics which were stored in a database are retrieved, and a fraud-risk index is determined based on the agent-specific summary statistics.

The fraud-risk index may relate to statistics related to a length of time an agent has been with a company; a number of received complaints; amounts of transactions associated with received complaints; a number of paid-in-error errors; a number of chargebacks; amounts of transactions associated with complaints, paid-in-error errors, and chargebacks; amounts of total transactions; a number of incidences when an agent was previously identified as suspected as a fraud risk based on fraud-risk indices; a number of transaction look-ups; a number of payouts; a send-pay interval duration; a number of matched transactions and/or a distribution of digits in amounts of processed or paid transactions.

The fraud-risk index may comprise a number. A fraud-risk index may be determined in a manner (e.g., using a formula with normalization) such that the fraud-risk index is constrained within a set range (e.g., between 0 and 1). In some instances, the fraud-risk index is theoretically unbounded in at least one direction (e.g., such that there is no upper limit). The fraud-risk index may comprise an indicator, such as a text indicator. For example, the fraud-risk index may be equal to one of the following values: No fraud risk, minimal fraud risk, average fraud risk, above-average fraud risk, large fraud risk.

Eqn. 10 shows one example of a formula that may be used in the determination of a fraud-risk index:

$$FR = \text{average}(\max(x_1, x_2), (5 \cdot (x_1 + x_2))) \cdot x_3 + x_4 + x_5 + x_6 + \ldots x_7 + (0.1 \cdot x_8) + (3 \cdot x_9) + (0.05 \cdot x_{10}) + (3 \cdot x_{11}) \quad \text{(Eqn. 11)}$$

where:

$x_1$ is a ratio of comparing recent customer-complaint-number statistics to older similar statistics (see, e.g., Eqns. 2-10)

$x_2$ is a ratio of comparing recent transaction-amount statistics (e.g., associated with complaints) to older similar statistics (see, e.g., Eqns. 2-10)

$x_3$ is a start-date multiplier set to "1" if the agent has been with the company for more than a particular duration (e.g., 14 months), and otherwise is inversely proportional to the time that the agent has been with the company (see, e.g., Eqn. 1)

$x_4$ is a ratio of comparing recent paid-in-error-number statistics to older similar statistics (see, e.g., Eqns. 2-10)

$x_5$ is a ratio of comparing recent chargeback-number statistics to older similar statistics (see, e.g., Eqns. 2-10)

$x_6$ is a ratio comparing cumulative transaction amounts related to customer complaints, paid-in-error errors and chargebacks relative to a total transaction amount processed (received from customers or paid to customers)

$x_7$ is a factor set equal to "1" if the agent was previously identified as a fraud risk and "0" otherwise $x_8$ is a ratio comparing a number of transaction look-ups to a number of transactions paid to customers $x_9$ is a factor set to a percentage of transactions with a send-pay interval of less than 30 minutes, unless the value would be less than 0.20, in which case it is set to "0"

$x_{10}$ is a number of first transactions, each matched to a second transaction, the second transaction occurring within 24 hours and being sent by the recipient of the first transaction $x_{11}$ is a factor set to a cumulative sum of pair-wise-differences between the probability that the first digit in the amounts of processed transactions was equal to any given digit and the expected probability based on Benford's distribution, unless the value would be less than or equal to 20%, in which case it is set to "0"

As shown in FIG. 4, multiple fraud-risk indices may be determined. For example, a fraud-risk index may be determined for each of a set of agents of interest (e.g., the set of agents including all representatives, all representatives with at least one associated complaint, or all representatives previously investigated for fraudulent activity). For each agent, for example, a processor may repeat 420 and 425, retrieving data associated with the agent of interest from the database and determining a fraud-risk index.

Predict Engagement in Fraud

At 430, one or more agents are predicted (e.g., by risk processor 207) to have engaged in fraudulent activity. This prediction may depend on one or more determined fraud-risk indices. For example, the fraud prediction may occur when a fraud-risk index crosses a (e.g., pre-determined) threshold (e.g., "1"). Fraud risk predictions may depend on a non-fraud-risk-index factors and/or a combination of factors. For example, in some instances, the fraud prediction depends on whether an agent's fraud-risk index had previously crossed the threshold (e.g., such that a fraud prediction would predict fraud engagement for all agents who were "newly" identified to have a fraud-risk index crossing a threshold). As another example, a fraud-risk prediction may depend on whether the total transaction amounts associated with complaints over a time interval exceeded a threshold (e.g., $25,000).

The prediction may depend on a distribution of fraud-risk indices. For example, a fraud prediction may occur when a fraud-risk index associated with an agent is among the highest indices (e.g., when the index is the highest index; one of the five highest indices; one of the 10 highest indices; or among the top 1, 5, 10 or 20 percent of indices).

In some instances, fraud-risk indices are strictly analyzed, such that the only agents predicted to have engaged in fraudulent activity are those with very suspicious (e.g., very high) indices. Thus, it may be very likely that the agent was engaged in the fraudulent activity. In other instances, fraud-risk indices are more leniently analyzed. In some of these instances, it may be more likely than not that agents identified by a risk method or system were actually not engaged in fraudulent activity. Nevertheless, the lenient approach may be preferable, for example, in situations where there are minimal or no repercussions directly imposed on agents identified in the prediction. For example, even though a system or method may predict that an agent was involved in fraudulent activity, the prediction may merely be used by a company to identify specific agents to further investigate in detail on a case-by-case basis.

Output Results

At 435, a fraud-risk index is output. In some instances, one or more agent-specific statistics and/or some or all transaction data is output. For example, one or more statistics used to calculate a fraud-risk index are output. In some instances, agents predicted to have been engaged in fraudulent activity are output. As one example, a list of agents is output, and a fraud-risk index is also output for each of the agents.

In some embodiments, output results are transmitted over a network. For example, the results may be sent to an email address or a company-internal webpage. In some embodiments, output results (e.g., the fraud-risk indices, statistics, data and/or identified agents) are displayed (e.g., on a display such as a computer screen that may be, for example, coupled to risk processor 207). In some embodiments, output results are sent to a printer.

As shown in FIG. 4, various actions associated with process 400 may be repeated. For example, the process may be repeated at regular intervals (e.g., every month), or it may be triggered by specific events (e.g., receiving a new complaint).

It will be understood that process 400 may be modified to exclude some identified actions, to combine actions, to include additional actions, or to rearrange actions. For example, a fraud-risk index may be output before one or more agents are predicted to have been engaged in fraudulent activity. As another example, a modified process 400 may not include any prediction that one or more agents engaged in fraudulent activity.

In some instances, multiple risk processors 206 are used. For example, one risk processor may process data (e.g., complaint data) to generate complaint summary statistics. One risk processor may process complaint summary statistics to generate agent-specific statistics. One or more risk processors may store and/or access data in one or more databases. One risk processor may determine a fraud-risk index based on accessed data.

What is claimed is:

1. A computer-implemented method comprising:
retrieving, from a first database, a plurality of transaction data associated with a plurality of prior transactions, wherein each of the plurality of transaction data comprises first data indicating a first transfer agent and a second transfer agent who were responsible for facilitating an incomplete transaction;
receiving second data indicating a customer associated with the incomplete transaction unsuccessfully attempted to receive funds associated with the incomplete transaction;
electronically storing the second data in a second database;
retrieving the first data and the second data from the second database;
identifying, based on the first data and the second data, a particular transfer agent;
calculating a fraud-risk index value for the particular transfer agent, wherein the fraud-risk index value for the particular transfer agent is calculated based on data retrieved from the second database;
comparing the fraud-risk index value calculated for the particular transfer agent to a predetermined fraud-risk index threshold; and
in response to determining that the fraud-risk index value calculated for the particular transfer agent exceeds the predetermined fraud-risk index threshold, outputting an indication of the particular transfer agent.

2. The method of claim 1, wherein the fraud-risk index value for the particular transfer agent is calculated based previously calculated fraud-risk index values that exceeded a previous threshold.

3. The method of claim 1, wherein the fraud-risk index value for the particular transfer agent is calculated based on a length of time that the particular transfer agent has been associated with a company.

4. The method of claim 1, wherein the second data includes a written complaint from the customer associated with the incomplete transaction.

5. The method of claim 1, wherein the second data includes an audio recording from the customer associated with the incomplete transaction.

6. The method of claim 1, further comprising determining the predetermined fraud-risk index threshold based at least in part on fraud-index value associated with a plurality of transfer agents, wherein the first transfer agent and the second transfer agent are part of the plurality of transfer agents.

7. The method of claim 6, wherein the predetermined fraud-risk index threshold is determined on an average fraud-index value of the plurality of transfer agents.

8. A non-transitory, computer-readable storage medium having stored thereon instructions, which, when executed by one or more processing devices, cause the one or more processing devices to perform operations comprising:
retrieving, from a first database, a plurality of transaction data associated with a plurality of prior transactions, wherein each of the plurality of transaction data comprises first data indicating a first transfer agent and a second transfer agent who were responsible for facilitating an incomplete transaction;
receiving second data indicating a customer associated with the incomplete transaction unsuccessfully attempted to receive funds associated with the incomplete transaction;
electronically storing the second data in a second database;
retrieving the first data and the second data from the second database;
identifying, based on the first data and the second data, a particular transfer agent;
calculating a fraud-risk index value for the particular transfer agent, wherein the fraud-risk index value for the particular transfer agent is calculated based on data retrieved from the second database;
comparing the fraud-risk index value calculated for the particular transfer agent to a predetermined fraud-risk index threshold; and
in response to determining that the fraud-risk index value calculated for the particular transfer agent exceeds the predetermined fraud-risk index threshold, outputting an indication of the particular transfer agent.

9. The non-transitory, computer-readable storage medium of claim 8, wherein the fraud-risk index value for the particular transfer agent is calculated based previously calculated fraud-risk index values that exceeded a previous threshold.

10. The non-transitory, computer-readable storage medium of claim 8, wherein the fraud-risk index value for the particular transfer agent is calculated based on a length of time that the particular transfer agent has been associated with a company.

11. The non-transitory, computer-readable storage medium of claim 8, wherein the second data includes a written complaint from the customer associated with the incomplete transaction.

12. The non-transitory, computer-readable storage medium of claim 8, wherein the second data includes an audio recording from the customer associated with the incomplete transaction.

13. The non-transitory, computer-readable storage medium of claim 8, the operations further comprising determining the predetermined fraud-risk index threshold based at least in part on fraud-index value associated with a plurality of transfer agents, wherein the first transfer agent and the second transfer agent are part of the plurality of transfer agents.

14. The non-transitory, computer-readable storage medium of claim 13, wherein the predetermined fraud-risk index threshold is determined on an average fraud-index value of the plurality of transfer agents.

15. A system comprising:
one or more processors; and
a memory coupled with the one or more processors, the memory configured to store instructions that when executed by the one or more processors cause the one or more processors to:
retrieve, from a first database, a plurality of transaction data associated with a plurality of prior transactions, wherein each of the plurality of transaction data comprises first data indicating a first transfer agent and a second transfer agent who were responsible for facilitating an incomplete transaction;
receive second data indicating a customer associated with the incomplete transaction unsuccessfully attempted to receive funds associated with the incomplete transaction;
electronically store the second data in a second database;
retrieve the first data and the second data from the second database;
identify, based on the first data and the second data, a particular transfer agent;
calculate a fraud-risk index value for the particular transfer agent, wherein the fraud-risk index value for the particular transfer agent is calculated based on data retrieved from the second database;
compare the fraud-risk index value calculated for the particular transfer agent to a predetermined fraud-risk index threshold; and
in response to determining that the fraud-risk index value calculated for the particular transfer agent exceeds the predetermined fraud-risk index threshold, output an indication of the particular transfer agent.

16. The system of claim 15, wherein the fraud-risk index value for the particular transfer agent is calculated based previously calculated fraud-risk index values that exceeded a previous threshold.

17. The system of claim 15, wherein the fraud-risk index value for the particular transfer agent is calculated based on a length of time that the particular transfer agent has been associated with a company.

18. The system of claim 15, wherein the second data includes a written complaint from the customer associated with the incomplete transaction.

19. The system of claim 15, wherein the second data includes an audio recording from the customer associated with the incomplete transaction.

20. The system of claim 15, wherein the one or more processors are further caused to determine the predetermined fraud-risk index threshold based at least in part on fraud-index value associated with a plurality of transfer agents, wherein the first transfer agent and the second transfer agent are part of the plurality of transfer agents.

* * * * *